(12) United States Patent
Hasha (10) Patent No.: US 7,383,533 B2
(45) Date of Patent: Jun. 3, 2008

(54) IMPLEMENTING VIRTUAL FUNCTIONS OF AN INTERFACE WITH INDIRECT INHERITENCE

(75) Inventor: Richard Hasha, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 444 days.

(21) Appl. No.: 11/023,726

(22) Filed: Dec. 28, 2004

(65) Prior Publication Data

US 2005/0114866 A1    May 26, 2005

Related U.S. Application Data

(63) Continuation of application No. 10/639,108, filed on Aug. 12, 2003, now Pat. No. 6,886,155, which is a continuation of application No. 09/322,965, filed on May 28, 1999, now Pat. No. 6,704,924.

(60) Provisional application No. 60/118,668, filed on Feb. 3, 1999.

(51) Int. Cl.
*G06F 9/44* (2006.01)

(52) U.S. Cl. ..................................... 717/116

(58) Field of Classification Search ................ 717/116
See application file for complete search history.

(56) References Cited

U.S. PATENT DOCUMENTS

| 5,295,062 | A | * | 3/1994 | Fukushima | .................. | 700/83 |
| 5,327,529 | A | * | 7/1994 | Fults et al. | .................. | 715/762 |
| 5,327,562 | A | * | 7/1994 | Adcock | ....................... | 717/141 |
| 5,581,760 | A | * | 12/1996 | Atkinson et al. | ............ | 717/108 |
| 5,628,016 | A | * | 5/1997 | Kukol | ......................... | 717/140 |
| 5,689,703 | A | * | 11/1997 | Atkinson et al. | ....... | 707/103 R |
| 5,752,034 | A | * | 5/1998 | Srivastava et al. | .......... | 717/130 |
| 5,854,931 | A | * | 12/1998 | Jones et al. | ................... | 717/140 |
| 5,945,993 | A | * | 8/1999 | Fleischmann | ............... | 715/771 |
| 5,983,020 | A | * | 11/1999 | Sweeney et al. | ............ | 717/141 |
| 6,006,230 | A | * | 12/1999 | Ludwig et al. | ............... | 707/10 |
| 6,081,665 | A | * | 6/2000 | Nilsen et al. | ............... | 717/116 |
| 6,179,491 | B1 | * | 1/2001 | Choi et al. | ................... | 717/116 |
| 6,185,625 | B1 | * | 2/2001 | Tso et al. | .................... | 709/247 |

(Continued)

OTHER PUBLICATIONS

Stroustrup Bjarne, C++ Programming Language Third Edition, Jul. 7, 1997, Chapters 2 and 12.*
Borland C++ 3.1, User's Guide, p. 81, 1992.*
Nackman, Lee R. et al., "Base-Class Composition with Multiple Derivation and Virtual Bases," *Proceedings of the 1994 Usenix C++ Technical Conference*, Cambridge, MA, pp. 57-71, 1994.

(Continued)

*Primary Examiner*—Todd Ingberg
(74) *Attorney, Agent, or Firm*—Woodcock Washburn LLP (57) ABSTRACT

A method and system for implementing functions in a class that inherits an interface and that inherits an implementing class which implements the interface. A forwarding system adds to the class for each virtual function a forwarding implementation of that virtual function. The forwarding implementation forwards its invocation to the implementation of that the virtual function in the implementing class. The forwarding system implements a special forwarding instruction that specifies the interface and implementing class. A developer of a class that inherits the interface and the implementing class inserts the forwarding instruction into the class definition. When the forwarding system encounters such an instruction during compilation of the class definition, the forwarding system provides an implementation of each virtual function of the interface that forwards its invocation to a corresponding virtual function in the implementing class. The forwarding system also forwards virtual functions of any direct or indirect base interface of the interface to the implementing class.

6 Claims, 6 Drawing Sheets

U.S. PATENT DOCUMENTS

| | | | |
|---|---|---|---|
| 6,185,728 B1 * | 2/2001 | Hejlsberg | 717/109 |
| 6,198,479 B1 * | 3/2001 | Humpleman et al. | 715/733 |
| 6,219,046 B1 * | 4/2001 | Thomas et al. | 715/708 |
| 6,410,326 B1 * | 6/2002 | Gruber et al. | 435/455 |
| 6,425,007 B1 * | 7/2002 | Messinger | 709/224 |
| 6,457,030 B1 * | 9/2002 | Adams et al. | 715/523 |
| 6,704,924 B1 * | 3/2004 | Hasha | 717/116 |

OTHER PUBLICATIONS

"Object-Oriented Programming in C—The Linnaeus System," *IBM Technical Disclosure Bulletin 21* (9B):437-439, 1990.

Stroustrup, "The C++ Programming Language," *Addison-Wesley*, 3$^{rd}$ Edition, Chapters 2, and 12, Jul. 1998.

* cited by examiner

IMPLEMENTING VIRTUAL FUNCTIONS OF AN INTERFACE WITH INDIRECT INHERITENCE

CROSS REFERENCE TO RELATED APPLICATIONS

This application is a continuation of U.S. patent application Ser. No. 10/639,108, filed Aug. 12, 2003, entitled "METHOD AND SYSTEM FOR IMPLEMENTING VIRTUAL FUNCTIONS OF AN INTERFACE," now U.S. Pat. No. 6,886,155, which is a continuation of U.S. patent application Ser. No. 09/322,965, filed May 28, 1999, entitled "METHOD AND SYSTEM FOR IMPLEMENTING VIRTUAL FUNCTIONS OF AN INTERFACE," now U.S. Pat. No. 6,704,924, which claims benefit of U.S. patent application Ser. No. 60/118,668, entitled "COMMON DISTRIBUTED OBJECT PLATFORM," filed on Feb. 3, 1999; and is related to U.S. patent application Ser. No. 09/322,455, entitled "METHOD AND SYSTEM FOR TRACKING SOFTWARE COMPONENTS," filed on May 28, 1999; U.S. patent application Ser. No. 09/322,962, entitled "METHOD AND SYSTEM FOR TRACKING CLIENTS," filed on May 28, 1999; U.S. patent application Ser. No. 09/322,643, entitled "AUDIO VISUAL ARCHITECTURE," filed on May 28, 1999; U.S. patent application Ser. No. 09/322,207, entitled "METHOD AND SYSTEM FOR DISTRIBUTING ART," filed on May 28, 1999; U.S. patent application Ser. No. 09/322,964, entitled "METHOD AND SYSTEM FOR GENERATING A USER INTERFACE FOR DISTRIBUTED DEVICES," filed May 28, 1999; U.S. patent application Ser. No. 09/322,852, entitled "METHOD AND SYSTEM FOR MANAGING SOFTWARE COMPONENTS," filed on May 28, 1999; and U.S. patent application Ser. No. 09/322,457, entitled "METHOD AND SYSTEM FOR PROPERTY NOTIFICATION," filed on May 28, 1999; and U.S. patent application Ser. No. 09/322,459, entitled "METHOD AND SYSTEM FOR CONTROLLING ENVIRONMENTAL CONDITIONS," filed on May 28, 1999, which has matured into U.S. Pat. No. 6,466,234, the disclosures of which are incorporated herein by reference.

FIELD OF THE INVENTION

The described technology relates generally to object-oriented programming techniques and more specifically to a system for automatically implementing virtual functions.

BACKGROUND OF THE INVENTION

Object-oriented programming techniques allow for the defining of "interfaces" by which objects can expose their functionality independently of the implementation of the functionality. In the C++ programming language, an interface is defined by an abstract class whose virtual functions are all pure. A pure virtual function is one that has no implementation in the class. Thus, an interface defines only the order of the virtual functions within the class and the signatures of the virtual functions, but not their implementations. The following is an example of an interface:

```
class IShape
{
    virtual void draw(int x,y)=0;
    virtual void save(char filename)=0;
    virtual void clear(int x,y)=0;
}
```

This interface, named "IShape," has three virtual functions: draw, save, and clear. The "=0" after the formal parameter list indicates that each virtual function is pure. Concepts of the C++ programming language that support object-oriented programming are described in "The Annotated C++ Reference Manual," by Ellis and Stroustrup, published by Addison-Wesley Publishing Company in 1990, which is hereby incorporated by reference.

Once an interface is defined, programmers can write programs to access the functionality independent of the implementation. Thus, an implementation can be changed or replaced without having to modify the programs that use the interface. For example, the save function of the IShape interface may have an implementation that saves the shape information to a file on a local file system. Another implementation may save the shape information to a file server accessible via the Internet.

To ensure that an implementation provides the proper order and signatures of the functions of an interface, the class that implements the interfaces inherits the interface. The following is an example of a class that implements the IShape interface.

```
class Shape: IShape
{
    virtual void save(char filename){ ... };
    virtual void clear(int x,y){ ... );
    virtual void draw(int x,y) { ... };
    virtual void internal_save( ){ ... );
    int x;
    int y;
}
```

The first line of the class definition indicates by the ": IShape" that the Shape class inherits the IShape interface. The ellipses between the braces indicate source code that implements the virtual functions. The Shape class, in addition to providing an implementation of the three virtual functions of the IShape interface, also defines a new virtual function "internal_save," which may be invoked by one of the implementations of the other virtual functions. The Shape class also has defined two integer data members, x and y.

Figure 1:
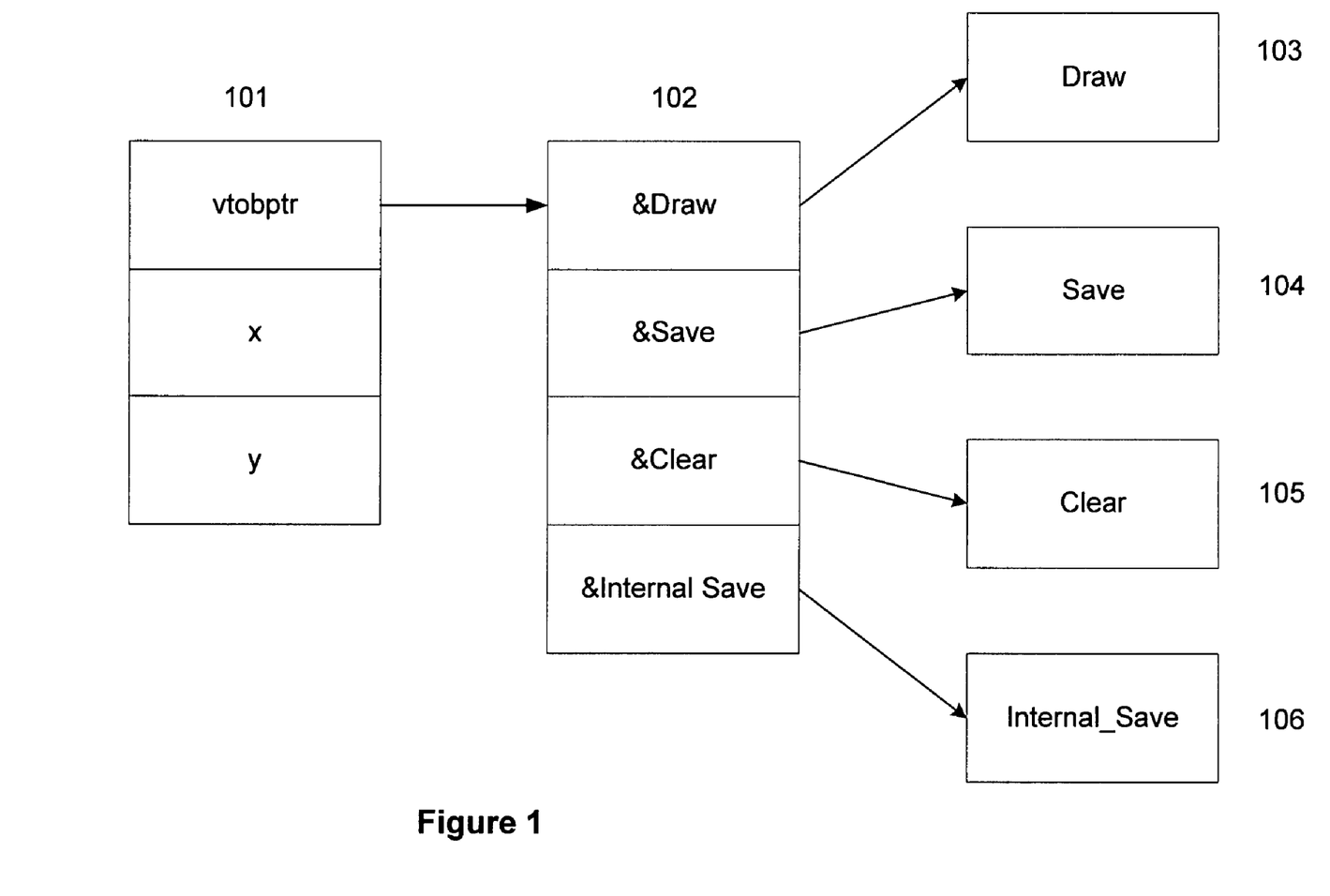
FIG. 1 illustrates a sample object layout for an object of the Shape class.

Typical C++ compilers generate virtual function tables to support the invocation of virtual functions. When an object for a class is instantiated, such a C++ compiler generates a data structure that contains the data members of the object and that contains a pointer to a virtual function table. The virtual function table contains the address of each virtual function defined for the class. FIG. 1 illustrates a sample object layout for an object of the Shape class. The object data structure 101 contains a pointer to a virtual function table and the data members x and y. The virtual function table 102 contains an entry for each virtual function. Each entry contains the address of the corresponding virtual function. For example, the first entry in the virtual function table contains the address of the draw function 103. The order of the references in the virtual function table is the same as defined in the inherited interface even though the Shape class specifies these three functions in a different order. In particular, the reference to the draw function is first, followed by the references to the save and clear functions.

The C++ compiler generates code to invoke virtual functions indirectly through the virtual function table. The following is C++ code for invoking a virtual function.:

```
Shape* pShape = new Shape;
pShape->save();
```

The pointer pShape points to an object in memory that is of the Shape class. When compiling this invocation of the virtual function, the compiler generates code to retrieve the address of the virtual function table from the object, to add to the retrieved address the offset of the entry in the virtual function table that contains the address of the function, and to then invoke the function at that calculated address.

The inheritance of interfaces allows for references to objects that implement the interfaces to be passed in an implementation independent manner. A routine that uses an implementation may define a formal argument that is a pointer to the IShape interface. The developer of the routine can be unaware that the implementation is actually the Shape class. To pass a reference to an object of the Shape class, a program that invokes the routine would type cast a pointer to the object of the Shape class to a pointer to the IShape interface. So long as the pointer points to a location that contains the address of the virtual function table and the virtual function table contains the entries in the specified order, the invoked routine can correctly access the virtual functions defined by the IShape interface:

Although the use of interfaces facilitates the development of programs that use and implement interfaces, difficulties do arise. The following C++ source code illustrates one of these difficulties.

```
class A
{
    virtual void A1( )=0;
}
class B : A
{
    virtual void B 1( )=0;
}
class AImp : A
{
    virtual void A1( ){ ... };
    virtual void A2( ){ ... };
}
class BImp : AImp, B (
{
    virtual void B1( ){ ... };
}
```

In this example, classes A and B are interfaces. Interface A defines virtual function A1, and interface B defines virtual function B1. Class AImp is an implementation of interface A and defines a new virtual function A2. Class BImp is an implementation of interface B that inherits the implementation of interface A, which is class AImp. Thus, class BImp inherits multiple classes: class AImp and interface B.

Figure 2:
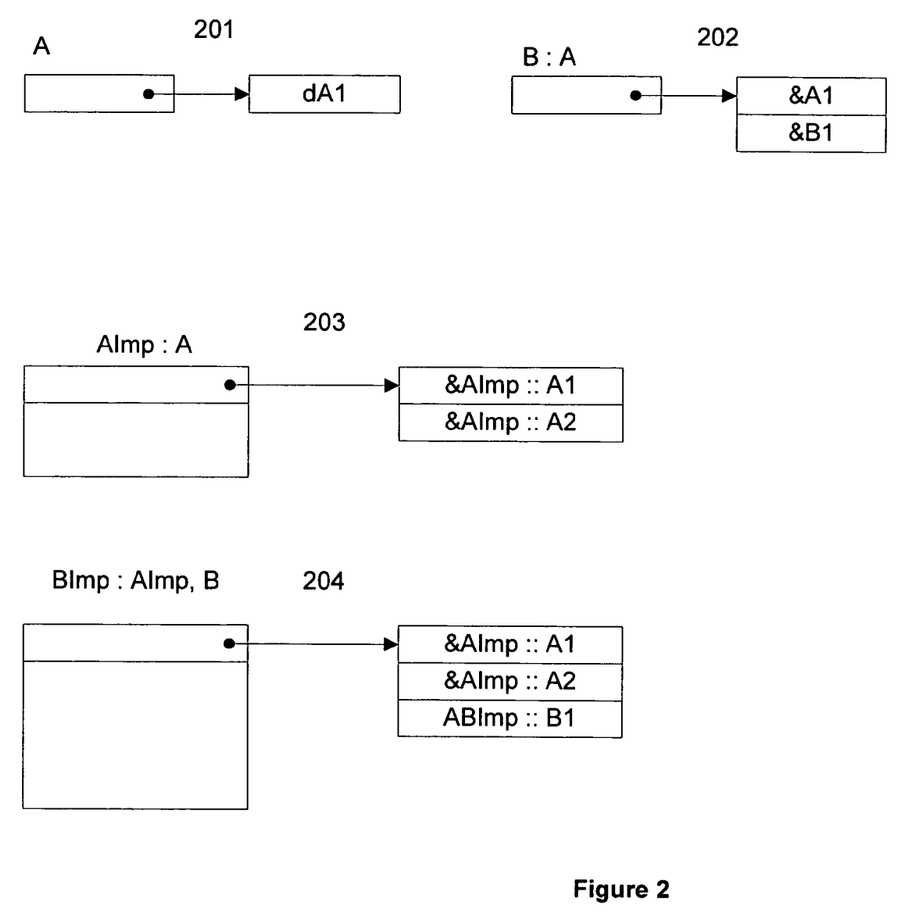
FIG. 2 illustrates the difficulty when the virtual function tables are merged.

Some C++ compilers have the option of merging the virtual function tables of multiple base classes into a single virtual function table in the derived class or of generating separate virtual function tables for each base class. One difficulty arises if the virtual function tables of the base classes are merged in the derived class. FIG. 2 illustrates the difficulty when the virtual function tables are merged. The object layouts 201 and 202 illustrate the order of the virtual functions within the virtual function tables. (Since interfaces A and B are abstract classes, objects of these classes cannot actually be instantiated.) To allow type casting as described above, an implementation of interface B needs to provide a virtual function table with entries in the same order as shown in object layout 202, that is with the entry for virtual function A1 followed immediately by the entry for virtual function B1. A problem arises when the implementation of interface A, which is class AImp, defines a new virtual function, such as virtual function A2. The virtual function table of class AImp is shown by object layout 203. Object layout 204 illustrates the virtual function table for class BImp when the virtual function tables are merged. This virtual function table for class BImp illustrates the order of the entries to be virtual functions A1, A2, and B1. If a pointer to an object of class AImp is type cast to a pointer to interface B, then the virtual function table would not have the entries in the order as specified by the interface B. In particular, the entry for virtual function A1 is not immediately followed by the entry for virtual function B1. A C++ compiler could have reordered in entries in the virtual function table within object layout 204 to be virtual functions A1, B1, and A2. In which case, the type casting for interface B would work. However, the type casting from a pointer to a class BImp object to a class AImp object would be incorrect because the class AImp defines that the entry for virtual function A1 is immediately followed by the entry for virtual function A2. Thus, a C++ compiler cannot define a single virtual function table that satisfies the virtual function table ordering of both interface B and class AImp.

Figure 3:
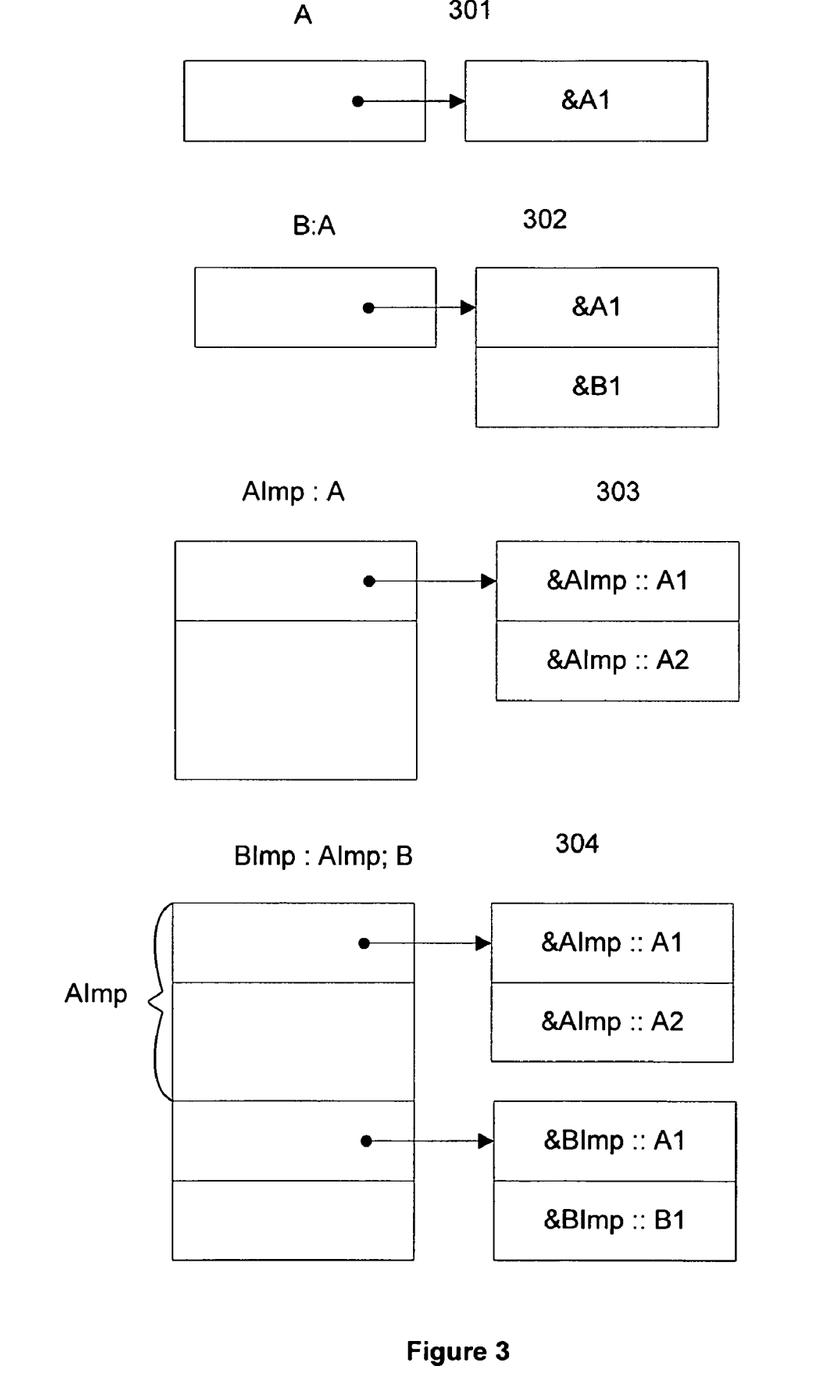
FIG. 3 illustrates the object layouts with separate virtual function tables.

Although the use of the separate option for generating virtual function tables alleviates this difficulty, additional difficulties arise. FIG. 3 illustrates the object layouts with separate virtual function tables. In this example, the object layout 304 for class BImp has two virtual function tables. The first virtual function table has the order of entries to be virtual functions A1 and A2, which is consistent with the ordering for class AImp. The second virtual function table has the order of entries to be virtual functions A1 and B1, which is consistent with the ordering for interface B. The difficulty arises because the developer of class BImp, who wants to reuse the implementation of interface A, which is class AImp, must provide an implementation for each virtual function of interface A within class BImp. (These multiple implementations can be avoided by virtually inheriting interface A. With such virtual inheritance, a C++ compiler might generate no virtual function tables with the required ordering of the virtual functions.) The developer of class BImp can implement each virtual function of interface A in a straightforward manner. In particular, the developer can implement each virtual function to forward its invocation to the corresponding virtual function in the implementation of interface A, which is class AImp. The following is an example implementation of class BImp:

```
Class BImp : AImp, B
{
    virtual void B 1( ){ ... };
    virtual void A 1( ){ return AImp::A1( )}
}
```

The implementation of virtual function A1 invokes the implementation of virtual function A1 in the class AImp. Although this implementation is straightforward, problems arise when interface A is changed. For example, if a new virtual function A3 is added to interface A, then the developer of the class BImp would need to change the class definition to include an implementation of the new virtual function A3. Although the changing of the class definition in this example may not be difficult, the changing of class definitions in systems that use complex inheritance hierarchies and many virtual functions can present difficulties. It would be desirable to have a technique which would avoid the difficulties of having to change class definitions when a new virtual function is added to an interface.

SUMMARY OF THE INVENTION

A method and system for implementing functions in a class that inherits an interface and that inherits an implementing class which implements the interface is provided. In one embodiment, a forwarding system adds to the class for each virtual function a forwarding implementation of that virtual function. The forwarding implementation forwards its invocation to the implementation of that virtual function in the implementing class. In one embodiment, the forwarding system implements a special forwarding instruction that specifies the interface and implementing class. A developer of a class that inherits the interface and the implementing class inserts the forwarding instruction into the class definition. When the forwarding system encounters such an instruction during compilation of the class definition, the forwarding system provides an implementation of each virtual function of the interface that forwards its invocation to a corresponding virtual function in the implementing class. The forwarding system also forwards virtual functions of any direct or indirect base interface of the interface to the implementing class.

DETAILED DESCRIPTION OF ILLUSTRATIVE EMBODIMENTS

Embodiments of the present technology provide a method and system for automatically generating implementations of virtual functions of interfaces. The system generates the implementations so that each virtual function forwards its invocation to a virtual function that provides an implementation. In one embodiment, the forwarding system implements a special forwarding instruction that specifies an interface and an implementing class. A developer of a class that inherits the interface and the implementing class inserts the forwarding instruction into the class definition. When the forwarding system encounters such an instruction during compilation of the class definition, the forwarding system provides an implementation of each virtual function of the interface that forwards its invocation to a corresponding virtual function in the implementing class. The forwarding system also forwards virtual functions of any direct or indirect base interface of the interface to the implementing class. Alternatively, the forwarding system automatically detects that no implementation has been provided for the interface and inserts a forwarding implementation to the implementing class.

In one embodiment, the forwarding system is implemented by adapting a compiler to recognize a special forwarding instruction and to automatically insert and implement the virtual functions. Alternatively, the forwarding system may be implemented using standard macros that are preprocessed by a compiler, such as a C++ compiler. The macro implementation of the forwarding system is referred to as the "macro system." The macro system defines a forwarding macro for each interface that provides an implementation of each virtual function that forwards the invocation of the virtual function to an implementation of that virtual function in a class whose name is passed as a parameter to the macro. The following illustrates the forwarding macro that is defined for class A:

```
class A
{
    virtual void A1( )=0;
    #define $forwardATo(interface)\
        virtual void A 1( ) { return interface##::A1( )};
}
```

The "#define" indicates that a macro is being defined, the "$forwardATo" is the name of the macro, and the "interface" is the name of a parameter that is passed when the macro is expanded. The body of the macro is "virtual void A1( ){return interface##::A1( )};" where "interface##" indicates that the passed parameter is to be substituted. The macro definition is terminated by a statement that does not end with a "\". In other words, a "\" at the end of a statement within the macro indicates that the macro continues onto the next line. When this macro is expanded the parameter such as "Imp," the result is:

virtual void A1( ){return Imp::A1( )};

which forwards the invocation of virtual function A1 to the implementation of virtual function A1 in class Imp.

The implementation of interface B, which is class BImp, can call the macro $forwardATo passing the name of the implementation of interface A, which is class AImp. When the macro is expanded, an implementation of virtual function A1 is provided that forwards its invocation to the implementation of class AImp. The following illustrates the use of that macro:

```
class BImp : AImp, B
{
    virtual void B1( ){ ... };
    $forwardATo(AImp)
}
```

The following illustrates the definition of class BImp when the macro is expanded:

```
class BImp : AImp, B
{
    virtual void B1( ){ ... };
    virtual void A1( ){return AImp::A1( )};
}
```

If new virtual functions are added to interface A, the $forwardATo macro is redefined to add statements that are forwarding implementations of the new virtual functions. Because class BImp calls that macro, when the macro is expanded, the definition of class BImp will include forwarding implementations of the new virtual functions. Thus, once a developer adds a forwarding macro to class BImp modifications to interface A are automatically reflected in class BImp.

The definition of such a forwarding macro needs to include statements that will generate forwarding implementations of each virtual function in inherited interfaces. The following illustrates the forwarding macro for interface B that inherits interface A:

```
class B : A
{
    virtual void B1( )=0;
#define $forwardBTo(interface)\
    $forwardATo(interface)\
    virtual void B1( ){ return interface##::B1( )};
}
```

An implementing class that inherits interface B need only expand the forwarding macro for interface B, which automatically expands the forwarding macro for interface A. The following illustrates an implementation of interface C, which is class CImp, that uses the forwarding macro of interface B:

```
class C : B
{
    virtual void C1( )=0;
}
class CImp : BImp, C
{
    virtual void C1( ){ ... } ;
    $forwardBTo(BImp)
}
```

The following illustrates expansion of the forwarding macro in class CImp:

```
class CImp : BImp, C
{
    virtual void C1( ){ ... };
    virtual void A1( ){return BImp::A1( ));
    virtual void B1( ){return BImp::B1( )};
}
```

A difficulty with the naming convention of these forwarding macros is that an implementation needs to know of any directly inherited interface of its directly inherited interface. For example, the implementation of interface C, which is class CImp, needs to know that interface B is directly inherited by interface C so that the appropriate forwarding macro, "$forwardBTo," can be used. One embodiment of the macro system overcomes this difficulty by defining an additional parent class forwarding macro for each interface that inherits an interface. The parent class forwarding macro has a name that is based solely on the interface for which it is defined, but calls the forwarding macro for its directly inherited interfaces. The following definition of interface B illustrates the parent class forwarding macro:

```
class B : A
{
    virtual void B1( )=0;
#define $forwardBTo(interface)\
    $forwardATo(interface)\
    virtual void B1( ){return interface##::B1( )};
#define $forwardBParentClassTo(interface)\
    $forwardATo(interface)
}
```

The parent class forwarding macro is "$forwardBParentClassTo." This macro calls the forwarding macro for its inherited interface A. An implementing class can call the parent class forwarding macro of its directly inherited interface rather than calling the forwarding macro of an indirectly inherited interface. Thus, the implementation need not be aware that an inherited interface happens to inherit another interface. The following illustrates the use of the parent class forwarding macro:

```
class BImp : AImp, B
{
    virtual void B1( ){ ... };
    $forwardBParentClassTo(AImp)
}
```

The expansion of the parent class forwarding macro is illustrated in the following:

```
class BImp : AImp, B
{
    virtual void B1( ){ ... };
    virtual void A1( ){return AImp::A1( ));
}
```

More generally, any interface regardless of whether it currently inherits another interface can provide an implementation of the parent class forwarding macro. If the interface does not currently inherit another interface, then the parent class forwarding macro would be defined to be empty. Thus, when such a parent class forwarding macro is expanded, no statements are inserted into the calling class definition and the expansion would have no effect. If, however, the interface is eventually changed to inherit another interface, then the parent class forwarding macro would be redefined to call the forwarding macro of the inherited interface. The change in the parent class forwarding macro would automatically be reflected when the parent class forwarding macro is expanded in the calling class definition.

Figure 4:
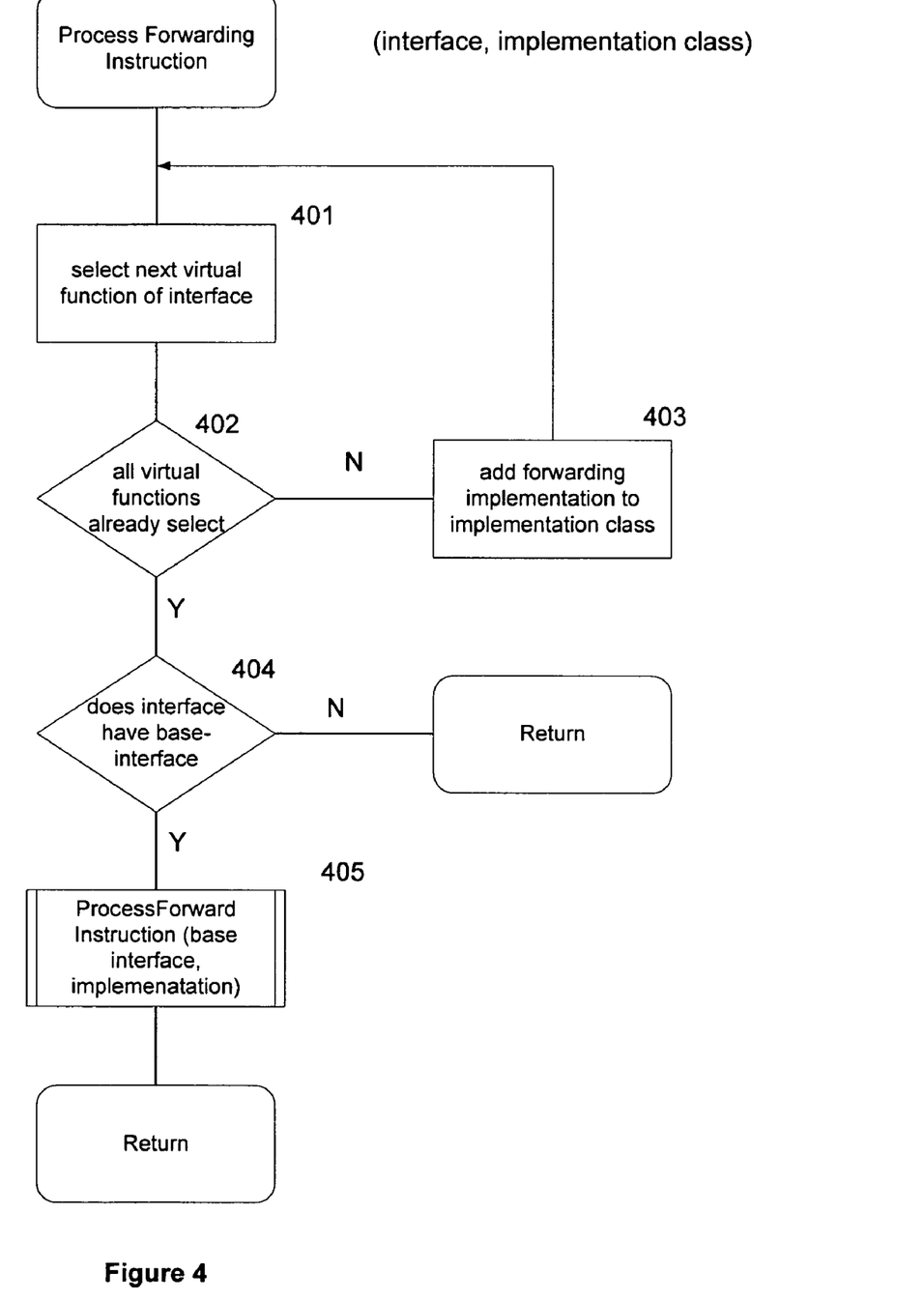
FIG. 4 is a block diagram of an example implementation of the forwarding system.

FIG. 4 is a block diagram of an example implementation of the forwarding system. In this implementation, the forwarding system may be implemented as part of a compiler or as a preprocessor to a compiler. The process forwarding instruction routine is invoked when the forwarding system encounters a special forwarding instruction, which specifies an interface and an implementing class or automatically detects such a situation. The routine inserts, into the class definition that inherits the interface and that inherits the implementing class, a forwarding implementation for each virtual function of the interface. The routine then recursively calls itself to insert forwarding implementations for virtual functions of any indirectly inherited interfaces of the interface. In steps 401-403, the routine loops inserting forwarding implementations for each virtual function of the interface. In step 401, the routine selects the next virtual function of the interface. In step 402, if all the virtual functions have already been selected, then the routine continues at step 404, else the routine continues at step 403. In step 403, the routine inserts a forwarding implementation of the selected virtual function that forwards its invocation to the implementing class. In step 404, if the interface has an inherited interface (i.e., a base interface), then the routine continues at step 405, else the routine returns. In step 405, the routine recursively invokes the process forwarding instruction routine passing the base interface and the implementing class. The routine then returns.

Figure 5:
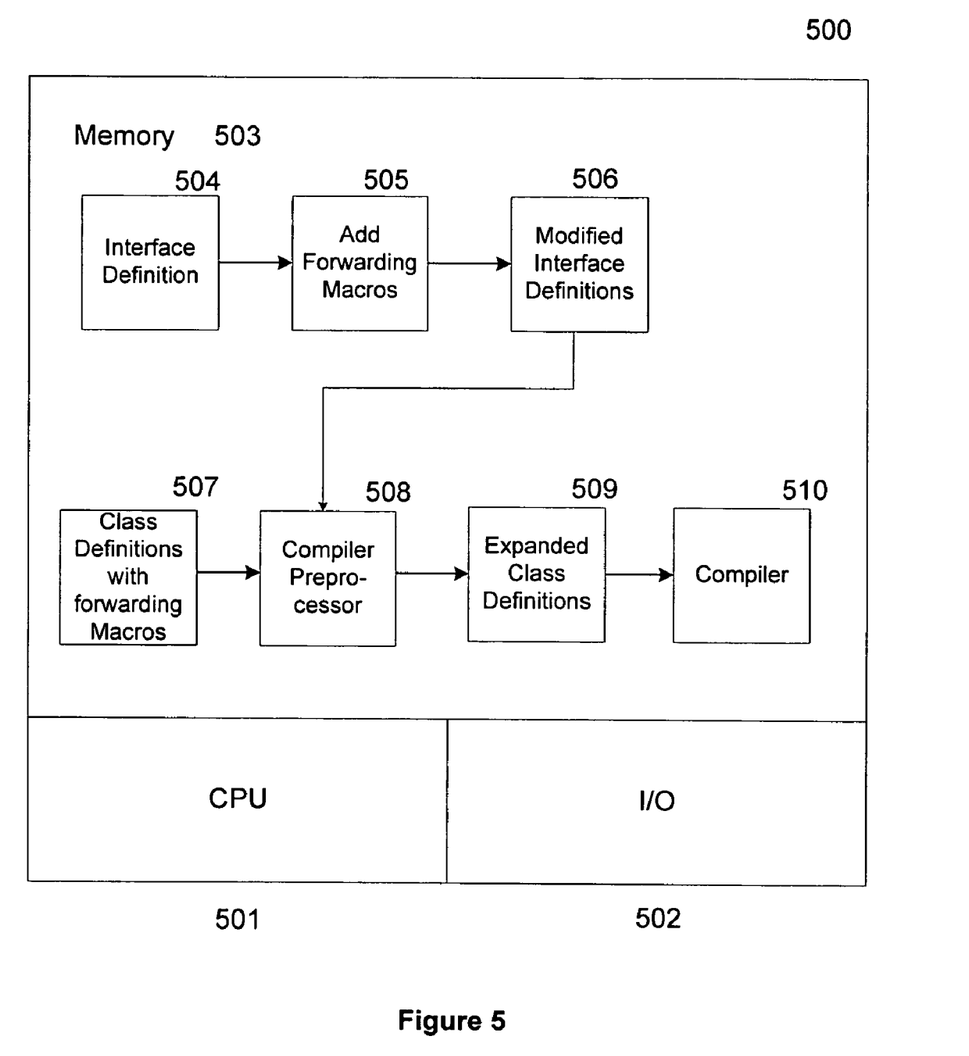
FIG. 5 is a block diagram illustrating a computer system for practicing the forwarding system.

FIG. 5 is a block diagram illustrating a computer system for practicing the forwarding system. The computer system 500 includes a central processing unit 501, I/O devices 502, and memory 503. The I/O devices may include computer readable media, such as a hard disk or a flexible disk, on which components of the forwarding system may be stored. The forwarding system that is stored in memory is the macro system. The forwarding system comprises an add forwarding macro component 505. The add forwarding macro component inputs interface definitions 504 and outputs modified interface definitions 506. The add forwarding macro component inserts the forwarding macro and the parent class forwarding macro into the interface definitions. The compiler preprocessor 508 inputs the modified interface definitions 506 and class definitions that have calls to the macros 507. The compiler preprocessor expands the macros within the class definitions to generate expanded class definitions 509. The compiler 510 inputs the expanded class definitions to generate the compiled code.

Figure 6:
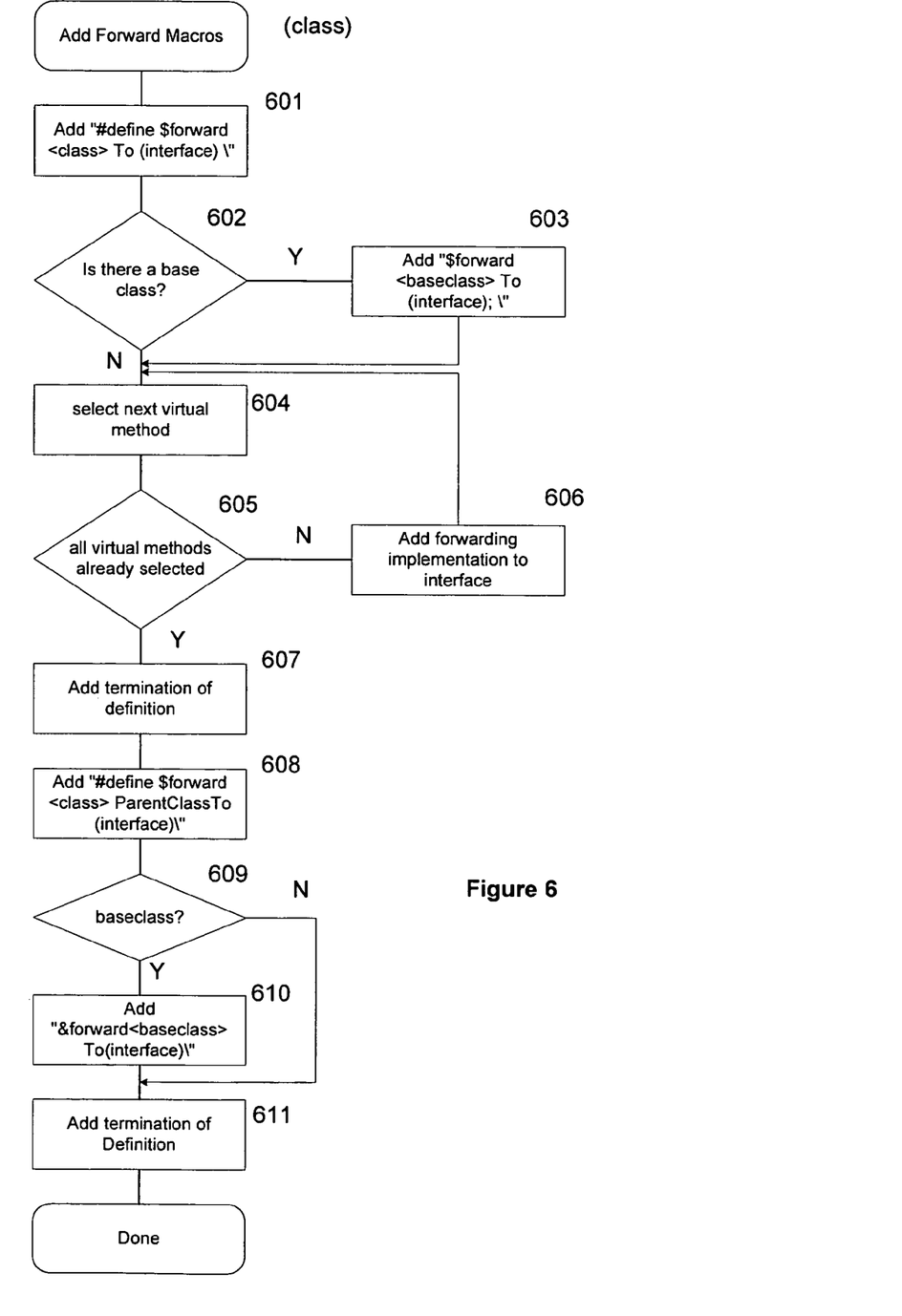
FIG. 6 is a flow diagram illustrating an example implementation of a routine to automatically add forwarding macros to interface definitions.

FIG. 6 is a flow diagram illustrating an example implementation of a routine to automatically add forwarding macros and parent class forwarding macros to interface definitions. This routine is passed an interface definition and inserts macro definitions for the forwarding macro and the parent class forwarding macro. In step 601, the routine inserts a statement "#define $forward<class>To(interface)\" into the interface definition. This statement starts the definition of the forwarding macro. The "<class>" is replaced by the name of the interface. In step 602, if the interface inherits a base interface, then the routine continues at step 603, else the routine continues at step 604. In step 603, the routine inserts the statement "$forward<baseclass>To(interface);\". The "<baseclass>" is replaced by the name of the inherited interface. This statement calls the forwarding macro of the inherited interface. In steps 604-606, the routine loops adding forwarding implementations for each virtual function of the interface. In step 604, the routine selects the next virtual function. In step 605, if all the virtual functions have already been selected, then the routine continues at step 607, else the routine continues at step 606. In step 606, the routine adds the forwarding implementation of the selected virtual function and loops to step 604 to select the next virtual function. In step 607, the routine adds a termination for the macro definition. The termination may be accomplished by inserting a blank line. In the step 608, the routine adds the statement "#define $forward<class>ParentClassTo(interface)\". This statement defines the parent class forwarding macro. In step 609, if the interface inherits a base interface, then the routine continues its step 610, else the routine continues that step 611. In step 610, the routine adds the statement "$forward<baseclass>To(interface)\". This statement calls the forwarding macro of the base interface. If, however, the interface inherits no base interface, then the parent class forwarding macro is empty. In step 611, the routine adds a termination of the macro definition and completes.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed:

1. A method of operating a computer system, comprising:
providing a first interface of an object oriented programming language, the first interface comprising a virtual function;
providing an implementing class that implements the virtual function of the first interface;
automatically inserting the implementation of the virtual function of the first interface in a second class object that inherits the first interface and the implementing class in response to an indicator within the source code of the second class object and;
automatically inserting into the second class object an implementation of another virtual function of a second interface that the first interface indirectly inherits.

2. The method as recited in claim 1 wherein the automatic insertion of the implementation of the virtual function of the first interface is performed by a compiler.

3. The method as recited in claim 1 wherein said automatically inserting includes automatically inserting instructions corresponding to the implementation of the virtual function at a location of the indicator within the second object.

4. The computer-readable medium bearing computer executable instructions for carrying out the acts of:
providing a first interface comprising a virtual function;
providing an implementing class that implements the virtual function of the first interface;
automatically inserting an implementation of the virtual function of the first interface in a second class object that inherits the first interface and the implementing class in response to an indicator within the source code of the second class object and;
automatically inserting into the second class object an implementation of another virtual function of a second interface that the first interface indirectly inherits.

5. The computer-readable medium as recited in claim 4 wherein the automatic insertion of the implementation of the virtual function of the first interface is performed by a compiler.

6. The computer-readable medium as recited in claim 4 wherein said automatically inserting includes automatically inserting instructions corresponding to the implementation of the virtual function at a location of the indicator included within the second object.

* * * * *